(12) United States Patent
Menashi et al.

(10) Patent No.: US 9,969,856 B2
(45) Date of Patent: *May 15, 2018

(54) AEROGEL BASED COMPOSITES

(75) Inventors: Jameel Menashi, Falmouth, MA (US); Ulrich Bauer, Sulzbach (DE); Elmar Pothmann, Kriftel (DE); Andrew A. Peterson, Boston, MA (US); Anna K. Wilkins, Weston, MA (US); Mihai Anton, Cambridge, MA (US); Dhaval A. Doshi, Lexington, MA (US); William H. Dalzell, Marshfield, MA (US)

(73) Assignee: Cabot Corporation, Boston, MA (US)

( * ) Notice: Subject to any disclaimer, the term of this patent is extended or adjusted under 35 U.S.C. 154(b) by 2029 days.

This patent is subject to a terminal disclaimer.

(21) Appl. No.: 12/105,629

(22) Filed: Apr. 18, 2008

(65) Prior Publication Data

US 2008/0287561 A1 Nov. 20, 2008

Related U.S. Application Data

(63) Continuation of application No. PCT/US2006/041114, filed on Oct. 20, 2006.

(60) Provisional application No. 60/730,598, filed on Oct. 27, 2005, provisional application No. 60/728,948, filed on Oct. 21, 2005.

(51) Int. Cl.

| | |
|---|---|
| *C08J 5/00* | (2006.01) |
| *C04B 14/00* | (2006.01) |
| *C08J 9/32* | (2006.01) |
| *C08J 9/00* | (2006.01) |
| *C08K 7/26* | (2006.01) |

(52) U.S. Cl.
CPC ............... *C08J 9/32* (2013.01); *C08J 9/0066* (2013.01); *C08J 2363/00* (2013.01); *C08K 7/26* (2013.01)

(58) Field of Classification Search
CPC ........ C08J 9/32; C08J 9/0066; C08J 2363/00; C08K 7/26
USPC ... 428/317.9, 319.1, 319.3, 319.7, 403, 407; 521/142, 155
See application file for complete search history.

(56) References Cited

U.S. PATENT DOCUMENTS

| | | | |
|---|---|---|---|
| 4,082,702 A * | 4/1978 | Harper | ........................ 523/219 |
| 5,124,364 A | 6/1992 | Wolff et al. | |
| 5,137,927 A | 8/1992 | Wolff et al. | |
| 5,158,727 A | 10/1992 | Coleman-Kammula et al. | |
| 6,040,375 A * | 3/2000 | Behme et al. | ............... 524/492 |

(Continued)

FOREIGN PATENT DOCUMENTS

| | | |
|---|---|---|
| EP | 0 340 707 | 11/1989 |
| EP | 0 473 215 A1 | 3/1992 |

(Continued)

OTHER PUBLICATIONS

Glycerol, Wikipedia, Retrieved Sep. 29, 2014 from <http://en.wikipedia.org/wiki/Glycerol>, 9 pages.*

(Continued)

*Primary Examiner* — Hai Vo

(57) ABSTRACT

Composites, such as syntactic foams, are described. The composite contains at least one polymer and at least one aerogel. The aerogel is coated with a coating substance to at least substantially prevent the intrusion of the polymer into the pores of the aerogel. Methods of making the composite are also described, as well as uses of the composite.

21 Claims, 6 Drawing Sheets

(56) References Cited

U.S. PATENT DOCUMENTS

| | | | |
|---|---|---|---|
| 6,143,400 | A | 11/2000 | Schwertfeger et al. |
| 6,413,914 | B1* | 7/2002 | Meier et al. .................. 504/362 |
| 6,689,388 | B2* | 2/2004 | Kuhrts .......................... 424/490 |
| 7,118,801 | B2* | 10/2006 | Ristic-Lehmann et al. .......................... 428/292.1 |
| 7,635,411 | B2* | 12/2009 | Rouanet et al. .............. 106/600 |
| 2005/0100728 | A1 | 5/2005 | Ristic-Lehmann et al. |
| 2005/0148692 | A1* | 7/2005 | Burchill et al. .............. 523/218 |
| 2006/0155008 | A1* | 7/2006 | Nakamura et al. ........... 523/205 |
| 2006/0164740 | A1* | 7/2006 | Sone et al. .................... 359/883 |
| 2006/0264133 | A1* | 11/2006 | Krajewski et al. ........... 442/104 |
| 2006/0269734 | A1* | 11/2006 | Krajewski et al. ........ 428/304.4 |
| 2007/0037903 | A1* | 2/2007 | Swift ............................ 523/218 |
| 2007/0102055 | A1* | 5/2007 | Blair et al. .................... 138/114 |
| 2010/0140532 | A1* | 6/2010 | Burchill, Jr. .................... 252/62 |

FOREIGN PATENT DOCUMENTS

| | | |
|---|---|---|
| EP | 0 489 319 A2 | 6/1992 |
| EP | 0 667 370 A2 | 8/1995 |
| JP | 05-182518 | 7/1993 |
| WO | WO 03/097227 A1 | 11/2003 |

OTHER PUBLICATIONS

International Search Report and Written Opinion of the International Searching Authority for corresponding International Patent Application No. PCT/US2006/041114.

Office Action (with English translation) received in corresponding Japanese Patent Application No. 2008-536837 dated Dec. 6, 2011 (8 pages).

Korean Office Action dated May 15, 2013 issued in corresponding Korean Patent Application No. 10-2008-7011982 (5 pages).

* cited by examiner

AEROGEL BASED COMPOSITES

This application is a continuation of PCT/US06/041114, filed Oct. 20, 2006, which in turn claims the benefit under 35 U.S.C. § 119(e) of prior U.S. Provisional Patent Application No. 60/728,948, filed Oct. 21, 2005, and U.S. Provisional Patent Application No. 60/730,598, filed Oct. 27, 2005, which are all incorporated in their entirety by reference herein.

BACKGROUND OF THE INVENTION

The present invention relates to syntactic foams and composites, as well as methods for preparing the same and uses for the syntactic foams and composites. More particularly, the present invention relates to syntactic foams and composites which contain aerogels.

Syntactic foam is generally considered prefabricated, manufactured "bubbles" or microsphere fillers in a resin milieu. Syntactic foams are composite materials whose resinous matrix is embedded with preformed particles such as glass or ceramic microspheres. Syntactic foams distinguish themselves from other foams by the fact that hollow or solid spheres of a predetermined size and packing composition are used to control the density of the foam.

Syntactic foams have been used for purposes which require a low density (mass per unit volume) packing material such as undersea/marine equipment for deep-ocean current-metering, anti-submarine warfare, sandwich composites, the aerospace industry and the automotive industry. Examples of syntactic foams include for example U.S. Pat. No. 5,120,769 which relates to syntactic foams having an insoluble matrix, and U.S. Pat. No. 3,832,426 which relates to foam having an insoluble matrix and carbon microspheres. Syntactic foams having a soluble polymer matrix are mentioned in U.S. Pat. No. 5,432,205. Syntactic foams have many industrial applications.

Prior to syntactic foams, there were generally two types of foams: blown foams created by the injection of gas; and, self-expanding foams created through the use of chemicals. More recently, materials created by mixing a solid with minute spheres of glass, ceramic, or polymer are finding an increasing range of uses in industrial and high-tech applications.

Blown foams are made by, mixing or injecting a gas into a liquid and causing it to froth like soap bubbles in a bathtub. When the bubbles solidify, a foam is created. Typically, self-expanding foams require the use of at least two chemical constituents: one to decompose into a gas to form the bubbles and one to form the walls of the cells. Again, when the chemical constituent around the bubbles solidifies, a foam is created.

Rigid foams and processes for their production are well known in the art. Such foams are typically produced by reacting a polyisocyanate with an isocyanate reactive material such as polyol in the presence of a blowing agent. A lot of the blowing agents used in the past are no longer acceptable, and the ones developed in recent years are available at much higher costs. Furthermore, the state of the art rigid foams prepared with blowing agents do not exhibit the high compression strength required when foams are used, i.e. in applications like deep sea pipeline insulation, up to 10,000 feet or higher.

In recent years, the substantial increases in costs of the basic materials used to make foam, has encouraged the development and use of filler materials to reduce the amount of the basic materials used and the weight of the finished materials. One of the suggested filler materials and insulating materials utilizes hollow microspheres. The expression "syntactic" as used herein refers to the use of hollow spheres or other material in a polymer matrix to produce a cellular material.

Expanded microspheres having a synthetic thermoplastic resin shell that encapsulates a liquid blowing agent are known. See, for example, U.S. Pat. Nos. 4,829,094, 4,843,104 and 4,902,722. U.S. Pat. Nos. 4,829,094 and 4,843,104 relate to a syntactic-polymer foam composition having a low density filler containing free flowing microspheres.

U.S. Pat. No. 4,916,173 relates to a polyurethane (PU) syntactic foam composition for millable modeling stock applications. These PU syntactic foam compositions have high glass transition temperatures and low coefficients of thermal expansion, and are prepared from a polymeric isocyanate, an amine-based polyol, a polyether triol, molecular sieve material and hollow microspheres. The foams are described as a solid polymer matrix. These compositions are based on polymethylene poly(phenyl isocyanate) and result in low physical properties (i.e. tensile strength, elongation, etc.) which may be suitable for modeling stock applications, but not for the more demanding requirements in deep sea pipeline insulation.

A solid polymer matrix is mentioned in U.S. Pat. No. 4,959,395. This patent relates to bulk polymerization of cycloolefin monomers by ring-opening polymerization wherein the microencapsulated blowing agents aid in filling molds during injection molding procedures such that both surfaces of the article being molded remain in contact with the mold surfaces.

U.S. Pat. Nos. 4,303,729 and 4,303,736 relate to the use of hollow plastic microspheres as filler materials in plastics. The microspheres described by these two are generally large diameter microspheres, i.e. in the range of 200 to 10,000 microns. These microspheres can be made from low thermal conductivity plastic compositions and blown with a low thermal conductivity gas to make improved insulation materials and composites.

Hollow microspheres having loadings of 2 to 5% by weight of the total composition are mentioned in U.S. Pat. No. 4,038,238. Low density polyurethanes are produced from rapid-setting polyurethane-forming compositions containing light weight hollow spheres or microballoons and a liquid viscosity reducing agent.

A rigid syntactic foam comprising glass microballoons is mentioned in U.S. Pat. No. 4,082,702. These foams are obtained by mixing an organic polyol, a polyisocyanate, a catalyst for the reaction of the polyol and the polyisocyanate, microballoons, and a flame retardant foam having a bimodal cell structure.

U.S. Pat. No. 3,510,392 relates to glass nodules in cellular polyurethane. The polyurethane contains a polyol and/or polyester reacted with an polyisocyanate, and water during crosslinking to provide a gaseous blowing agent. The reactive components are homogeneously mixed in a suitable mixing device with a surfactant and catalyst to control the rate of reaction. Cellulate glass nodules are added to the homogeneous mixture in the bottom of a mold cavity which is then closed and foaming occurs. These are suitable for building panels having a continuous polyurethane phase and a discontinuous phase (i.e. cellular glass nodules).

U.S. Pat. No. 6,166,109 relates to syntactic rigid PUR/PIR foam boardstock. These hollow microspheres are filled with a hydrocarbon, air or vacuum, to introduce uniform cell geometries in the foams. The microspheres, which have an average diameter of 0.01 to 60 microns, are encapsulated with a closed cell polyurethane foam. Foams in the examples are based on a polyester, a surfactant, catalysts, water, a chlorofluorocarbon blowing agent and a polymethylene poly (phenylisocyanate). These syntactic rigid foams have a bimodal cell structure.

JP 4257429 relates to the manufacture of foam sheets with smooth surfaces which are useful for thermal insulators and packaging materials. The foam sheets of this reference can be prepared by applying a composition containing an organic polymer binder and a low boiling point solvent sealed thermally expandable microcapsules on a base film, laminating a polyester film on the coated layer, heating to dry and expand the coated layer and removing the polyester film. The resultant foam sheets have uniform closed cells and a smooth surface.

Thermally insulating syntactic foam compositions are mentioned in U.S. Pat. No. 6,284,809. These foam compositions have thermal conductivities less than 0.120 watts/meter-° K and exhibit acceptable strength and buoyancy characteristics for sub-sea applications at depths of up to about 10,000 ft.

Conventional syntactic foams use prefabricated or manufactured "bubbles" such as microspheres. Some refer to the microspheres as microballoons or even macroballoons. Syntactic foams can be prepared by mechanically combining the microspheres with a resin to form a composite material. Whereas blown and self-expanding foams and surfactant foams develop a fairly random distribution of gas pockets of widely varying sizes and shapes, the porosity of syntactic foams can be much more closely controlled by careful selection and mixing of the microspheres with the resin milieu. Syntactic foams can also be called assembled foams.

While ordinary foams are visibly porous, syntactic foams can have cells so small that the material appears to be a homogeneous solid. Syntactic foams are typically used in deep-submergence vehicles, instrument packaging, electronic gear, cable buoys, floatation collars for deep-water drilling operations, radio frequency and aerospace applications, and by pattern-makers in factories. In other words, the foams are used in industrial applications where, for example, buoyancy is important. Syntactic foams can also be used as carriers of coated or uncoated chemicals, biologicals, nutraceuticals, growth factors, amino acids, bioactive materials and pharmaceutically active materials for pharmaceutical, sanitary, veterinary, agricultural and medical applications.

Some previous patents in this area include U.S. Pat. No. 3,856,721 relating to a syntactic foam produced by a controlled curing of a polymer which is a homopolymer of butadiene or a copolymer of butadiene and styrene or the like, at least 40% of which polymer is butadiene. Instead of styrene, a methyl or ethyl derivative can be used. The syntactic foam includes minute hollow spheres which give strength to the foam product and the syntactic foam product has a very low density. The polymeric material is subjected to a two-stage cure. The first stage being a low-temperature curing system utilizing methylethyl ketone (MEK) peroxide or other peroxides used in lower-temperature cures, cobalt naphthenate, iron naphthenate, and acetylacetone (pentanedione) or the like; the peroxide used in the second stage requiring a higher temperature for activation.

U.S. Pat. No. 4,250,136 relates to a sandwich of composite materials assembled and placed within a mold having the shape of the article to be formed. The composite sandwich is comprised of the following ingredients: (1) a first or bottom layer of reinforcing material such as fiberglass in woven or mat form; (2) a first layer of initially resilient and open-cell foam containing a liquid thermosetting resin such as epoxy, polyester, vinylester, or the like, is laid over the first reinforcing layer, (3) a second layer of reinforcing material is laid over the first resin-containing, open-cell foam layer; (4) a suitable quantity of uncured syntactic foam having a dough-like consistency is placed over the second reinforcing layer, (5) a third reinforcing layer is placed over the uncured and amorphous syntactic foam; (6) a second layer of liquid, resin-containing, open-cell, resilient foam is overlaid on the third reinforcing layer; and (7) a fourth or upper layer of reinforcing material is laid upon the second resin-containing foam layer. The composite sandwich is then placed within the mold and subjected to suitable heat and pressure to cause the uncured sandwich to assume the internal shape of the mold.

U.S. Pat. No. 4,425,441 relates to a high temperature and flame resistant closed cell polyimide foam material and methods of making the foam. An aromatic tetracarboxylic acid dianhydride is reacted with an oxontine to produce an N-substituted imide, which is then esterified with a suitable alcohol. The resulting liquid is dried and the dry residue is reduced to a uniform powder having particles with diameters generally in the 0.5 to 10 mm range. The powder is preferably further dried, either before or after final size reduction, in a moderate vacuum at moderate temperature to remove any excess residual alcohol. The powder spontaneously expands to form a closed cell foam when heated to a temperature in the range of about 90° to 150° C. for a suitable period. When the powder is expanded in a closed mold, a consolidated, closed cell foam product results. When expanded in an unrestricted manner, closed cell "macroballoons" having average diameters between about 0.4 mm to 15 mm result.

U.S. Pat. No. 4,518,717 relates to methods of making low density modified polyimide/polyimide-amide foams and the resulting compositions. An N-substituted aliphatic imide is prepared by reacting a suitable aromatic dianhydride with a suitable oxime. A polyimide forming material is prepared by dissolving the N-substituted aliphatic imide in an esterifying solvent, then adding a suitable aromatic diamine. This material is dried to a powder. A suitable hydrated compound which is stable up to at least about 100° C. is mixed with the powder. A foam is then produced by heating the material to a reaction temperature for a period sufficient to produce a stable foam. The material melts, then spontaneously expands into a foam which becomes self supporting and cures to a resilient flexible foam. The addition of the hydrated compound is found to result in an exceptionally low density foam. Depending upon heating conditions, a polyimide, polyimide-amide or mixture thereof may be produced, resulting in foams having selectively variable physical properties.

U.S. Pat. Nos. 4,161,477, 4,183,838, and 4,183,839 relate to certain polyimide compositions which are flame resistant and useful as coatings and adhesives. The coating and adhesive compositions described in the above-mentioned patents are made by first preparing a suitable bisimide by reacting an aromatic tetracarboxylic acid dianhydride with a cyclic amide or oxime.

Difficulties have been experienced, however, in producing syntactic foams that have a density which is comparable to conventional foams. Typical densities of syntactic foams vary between 0.3 and 0.5 g/cm$^3$, whilst conventional foams typically vary between 0.01 and 0.1 g/cm$^3$. The density of syntactic foams has generally been restricted by the limited porosity of the foams. Porosity is a measure of the total void volume (e.g., air filled, gas filled, or the presence of a low density component) of the syntactic foam, and constitutes the sum of the void volume of the microspheres and the interstitial void volume. Using current methods of syntactic foam manufacture, the void volume provided by the microspheres is greater than the void volume provided by the interstitial spaces. Thus, the density of syntactic foams have been limited by the void volume of the microspheres. As such, the application of syntactic foams have been limited.

The patents and publications mentioned above and throughout the present application are incorporated in their entirety by reference and form a part of the present application.

SUMMARY OF THE PRESENT INVENTION

A feature of the present invention is to provide a composite that uses a material other than hollow glass or polymer microspheres for purposes of forming a syntactic foam.

A further feature of the present invention is to provide a composite, such as a syntactic foam, having low thermal conductivity, and a small composite density.

An additional feature of the present invention is to provide methods to use aerogels in polymer composites and yet achieve the desirable properties attributed to the aerogel, such as low density, low thermal conductivity, low electrical conductivity, low dielectric constant and/or shock absorption, and/or light transmission.

A further feature of the present invention is to provide a composite, such as a syntactic foam, having lower thermal conductivities, which can be at equal or greater compressive strengths.

Additional features and advantages of the present invention will be set forth in part in the description that follows, and in part will be apparent from the description, or may be learned by practice of the present invention. The objectives and other advantages of the present invention can be realized and attained by means of the elements and combinations particularly pointed out in the description and appended claims.

To achieve these and other advantages, and in accordance with the purposes of the present invention, as embodied and broadly described herein, the present invention relates to a composite comprising at least one polymer, ceramic and/or glass and at least one aerogel. In one or more embodiments, the polymer, ceramic and/or glass is preferably present as the matrix or continuous phase in the composite. The aerogel, which generally has pores, is at least partially, if not fully, surface coated with at least one coating to substantially prevent intrusion of the polymer, ceramic and/or glass into the pores. Preferably, the coating on the aerogel is a thin coating layer and a coating which is on the outer aerogel particle surface only, thus closing the pores but not penetrating into the inner pore volume of the aerogel. In one or more embodiments, the coating prevents the polymer, ceramic and/or glass, as well as other substances, from getting into the inner pore volume of the aerogel. By providing such a coating, the attributes of the aerogel are maintained, thus permitting the use of the aerogel in a polymer, ceramic and/or glass matrix and obtain desirable properties, such as low density and desirable thermal conductivities.

Alternatively, if a hydrophobic aerogel is used, then an aqueous system, where the polymer is dissolved, dispersed, emulsified, or mixed can be used to form a composite such that the polymer minimally intrudes the pore volume.

The present invention also relates to a composite comprising at least one polymer, ceramic and/or glass and at least one treated aerogel. The aerogel, which generally has pores, is at least partially, if not fully, treated with a treating agent. The treated aerogel remains porous. In one or more embodiments, upon introduction of the treated aeerogel into at least one polymer, ceramic and/or glass, the polymer, ceramic and/or glass of the matrix does not substantially enter the pores of the treated aerogel, for instance, due to the hydrophobic nature of the aerogel. The treated aerogel provides the ability of the aerogel to be distributed, dispersed or otherwise introduced into the polymer, ceramic and/or glass matrix.

The present invention also relates to a composite comprising at least one polymer, ceramic and/or glass and at least one treated aerogel. The aerogel, which generally has pores, is at least partially, if not fully, treated with a treating agent. The treated aerogel remains porous. In one or more embodiments, upon introduction of the treated aerogel into at least one polymer, ceramic and/or glass, the polymer, ceramic and/or glass of the matrix does not substantially enter the pores of the treated aerogel, for instance, due to the hydrophobic nature of the aerogel. The treated aerogel provides the ability of the aerogel to be distributed, dispersed, or otherwise introduced into the polymer, ceramic and/or glass matrix.

In at least one embodiment, the present invention relates to a composite comprising at least one polymer, ceramic and/or glass as a matrix and at least one aerogel. The composite can be used in a number of applications. For instance, the composite can be a syntactic foam. The aerogel can be a treated aerogel and/or a coated aerogel. The treating agent and/or coating agent can be in an aqueous solvent or organic solvent in order to deliver the treating agent or coating agent to the aerogel. The polymer, ceramic and/or glass matrix can be in a solvent, that is aqueous or non-aqueous.

In another embodiment, the present invention relates to aerogel having pores, wherein at least a portion of said aerogel is at least partially coated with a coating to substantially prevent intrusion of a polymer, ceramic and/or glass into the pores of the aerogel.

The present invention in one or more embodiments, also relates to a method of making the composite of the present invention by forming one or more coatings on the surface of the aerogel and then mixing the coated aerogel with at least one polymer, ceramic and/or glass to form the composite of the present invention, which can be a syntactic foam.

The present invention, in addition, relates to a method of making the composite of the present invention by treating the surface of the aerogel with one or more chemicals, such as a surfactant or wetting agent or amphiphile, and then mixing the treated aerogel with at least one polymer, ceramic and/or glass to form the composite of the present invention, which can be a syntactic foam.

Also, the present invention relates to a method of making the composite of the present invention by treating the surface of the aerogel with one or more chemicals, such as one or more surfactants and/or wetting agents, to form a treated aerogel and then coating the treated aerogel with one or more coatings to form a coated, treated aerogel and then mixing the coated, treated aerogel with at least one polymer, ceramic and/or glass to form the composite of the present invention, which can be a syntactic foam.

The present invention, also relates to uses for the composites of the present invention including, but not limited to, sub-sea pipeline insulation, and the uses described above.

The present invention includes, but is not limited to, the following embodiments as numbered below:

1. A composite comprising at least one polymer as a matrix and at least one aerogel having pores, wherein said polymer does not substantially enter the pores of said aerogel.

2. The composite of embodiment 1, comprising at least one polymer as a matrix and at least one aerogel having pores, wherein at least a portion of said aerogel is at least partially coated with a coating to substantially prevent intrusion of said polymer into said pores.

3. The composite of any one of embodiments 1-2, wherein at least a portion of said aerogel is treated with at least one treating agent to form a treated aerogel which remains substantially porous.

4. The composite of any one of embodiments 1-3, wherein said composite is a syntactic foam.

5. The composite of any one of embodiments 1-4, wherein said at least one polymer is polyurethane.

6. The composite of any one of embodiments 1-5, wherein said at least one polymer is an epoxide resin.

7. The composite of any one of embodiments 1-6, wherein said at least one polymer is polypropylene or polyethylene or both.

8. The composite of any one of embodiments 2-7, wherein said aerogel has a surface and an inner pore volume and wherein said coating is on the surface of said aerogel, thus closing the pores but not penetrating into the inner pore volume of the aerogel.

9. The composite of any one of embodiments 2-8, wherein said aerogel has an inner pore volume and said coating prevents said at least one polymer from entering into the inner pore volume of the aerogel.

10. The composite of any one of embodiments 2-9, wherein said coating on said aerogel is a polymeric coating.

11. The composite of any one of embodiments 2-10, wherein said coating comprises at least one lipophilic polymer.

12. The composite of any one of embodiments 2-11, wherein said coating comprises a wetting agent or surfactant.

13. The composite of any one of embodiments 2-12, wherein said coating is a wax or inorganic material such as glass or a ceramic.

14. The composite of any one of embodiments 2-13, wherein said coating consists of a surface coating on said aerogel.

15. The composite of any one of embodiments 2-14, wherein said coating bridges over said pores.

16. The composite of any one of embodiments 1-15, wherein said polymer is an organic polymer and said coating is a water-based polymer coating.

17. The composite of any one of embodiments 2-16, wherein said polymer is a water-based polymer and said coating comprises a surfactant or wetting agent.

18. The composite of any one of embodiments 1-17, wherein said coating penetrates no more than 10% beneath the surface of said aerogel, wherein said percentage is based on the average diameter of the aerogel.

19. A method of preparing the composite of any one of embodiments 1-18 or 40-57, comprising coating said aerogel with at least one coating substance in a classifier mill to form a coated aerogel and then combining said coated aerogel with at least one uncured polymer and then curing said polymer to form said composite.

20. A method of preparing the composite of any one of embodiments 1-19 or 40-57, comprising coating said aerogel by coating fine particles onto said aerogel and heating said aerogel to melt said fine particles to form a layer on said aerogel and then combining said coated aerogel with at least one uncured polymer and then curing said polymer to form said composite.

21. A method of preparing the composite of any one of embodiments 1-19 or 40-57, comprising coating said aerogel with an aqueous based solution comprising a first reactant dissolved or dispersed or emulsified in an aqueous solvent and then adding a non-polar solvent containing a second reactant to said aerogel coated with said aqueous based solution, and then removing said non-polar solvent to obtain a reaction product of the first and second reactant to form a coated aerogel, and then combining said coated aerogel with at least one uncured polymer and then curing said polymer to form said composite.

22. Insulated pipe comprising a pipe insulated with the syntactic foam of embodiment 4.

23. An article comprising the composite of any one of embodiments 1-18 or 40-57.

24. Insulation material comprising the composite of any one of embodiments 1-18 or 40-57.

25. A coated aerogel comprising aerogel having pores, wherein said aerogel is at least partially coated with at least one coating to substantially prevent intrusion of a polymer into said pores.

26. The coated aerogel of embodiment 25, wherein said coating has a surface and an inner pore volume and wherein said coating is on the surface of said aerogel, thus closing the pores but not penetrating into the inner pore volume of the aerogel.

27. The coated aerogel of any one of embodiments 25-26, wherein said coating has an inner pore volume and said coating prevents said polymer from entering into the inner pore volume of the aerogel.

28. The coated aerogel of any one of embodiments 25-27, wherein said coating on said aerogel is a polymeric coating.

29. The coated aerogel of any one of embodiments 25-28, wherein said coating comprises at least one lipophilic polymer.

30. The coated aerogel of any one of embodiments 25-29, wherein said coating comprises a wetting agent or surfactant.

31. The coated aerogel of any one of embodiments 25-30, wherein said coating is a wax or inorganic material such as glass or a ceramic.

32. The coated aerogel of any one of embodiments 25-31, wherein said coating consists of a surface coating on said aerogel.

33. The coated aerogel of any one of embodiments 25-32, wherein said coating bridges over said pores.

34. The coated aerogel of any one of embodiments 25-33, wherein said coating is an organic polymer and said coating is a water-based polymer coating.

35. The coated aerogel of any one of embodiments 25-34, wherein said coating is a water-based polymer and said coating comprises a surfactant or wetting agent.

36. The coated aerogel of any one of embodiments 25-35, wherein said coating penetrates no more than 10% beneath the surface of said aerogel, wherein said percentage is based on the average diameter of the aerogel.

37. The coated aerogel of any one of embodiments 25-36, comprising a treating agent present between said coating and aerogel.

38. The coated aerogel of any one of embodiments 25-37, comprising at least two coatings.

39. The coated aerogel of embodiment 38, wherein a first coating substantially prevents intrusion of said polymer into said pores, and wherein at least a second coating provides one or more functional properties to the coated aerogel.

40. A composite comprising at least one ceramic as a matrix and at least one aerogel having pores, wherein said ceramic does not substantially enter the pores of said aerogel.

41. A composite comprising at least one glass as a matrix and at least one aerogel having pores, wherein said glass does not substantially enter the pores of said aerogel.

42. A composite comprising at least one inorganic material as a matrix and at least one aerogel having pores, wherein said inorganic material does not substantially enter the pores of said aerogel.

43. A composite comprising at least one ceramic and/or glass as a matrix and at least one aerogel having pores, wherein said ceramic and/or glass does not substantially enter the pores of said aerogel.

44. The composite of embodiment 43, comprising at least one ceramic and/or glass as a matrix and at least one aerogel having pores, wherein at least a portion of said aerogel is at least partially coated with a coating to substantially prevent intrusion of said ceramic and/or glass into said pores.

45. The composite of any one of embodiments 43-44, wherein at least a portion of said aerogel is treated with at least one treating agent to form a treated aerogel which remains substantially porous.

46. The composite of any one of embodiments 43-45, wherein said composite is a syntactic foam.

47. The composite of any one of embodiments 44-46 wherein said aerogel has a surface and an inner pore volume and wherein said coating is on the surface of said aerogel, thus closing the pores but not penetrating into the inner pore volume of the aerogel.

48. The composite of any one of embodiments 44-47, wherein said aerogel has an inner pore volume and said coating prevents said at least one ceramic and/or glass from entering into the inner pore volume of the aerogel.

49. The composite of any one of embodiments 44-48, wherein said coating on said aerogel is a polymeric coating.

50. The composite of any one of embodiments 44-49, wherein said coating comprises at least one lipophilic polymer.

51. The composite of any one of embodiments 44-50, wherein said coating comprises a wetting agent or surfactant.

52. The composite of any one of embodiments 44-51, wherein said coating is a wax or inorganic material such as glass or a ceramic.

53. The composite of any one of embodiments 45-53, wherein said coating consists of a surface coating on said aerogel.

54. The composite of any one of embodiment 44-53, wherein said coating bridges over said pores.

55. The composite of any one of embodiments 44-54 wherein said coating is a water-based polymer coating.

56. The composite of any one of embodiment 44-55, wherein said coating comprises a surfactant or wetting agent.

57. The composite of any one of embodiments 44-56, wherein said coating penetrates no more than 10% beneath the surface of said aerogel, wherein said percentage is based on the average diameter of the aerogel.

58. A method of preparing the composite of any one of embodiments 43-57, comprising coating said aerogel with at least one coating substance in a classifier mill to form a coated aerogel and then combining said coated aerogel with at least one ceramic and/or glass and then curing said polymer to form said composite.

59. A method of preparing the composite of any one of embodiments 43-57, comprising coating said aerogel by coating fine particles onto said aerogel and heating said aerogel to melt said fine particles to form a layer on said aerogel and then combining said coated aerogel with at least one ceramic and/or glass to form said composite.

60. A method of preparing the composite of any one of embodiments 43-57, comprising coating said aerogel with an aqueous based solution comprising a first reactant dissolved or dispersed or emulsified in an aqueous solvent and then adding a non-polar solvent containing a second reactant to said aerogel coated with said aqueous based solution, and then removing said non-polar solvent to obtain a reaction product of the first and second reactant to form a coated aerogel, and then combining said coated aerogel with at least one ceramic and/or glass to form said composite.

61. Insulated pipe comprising a pipe insulated with the syntactic foam of embodiment 46.

62. An article comprising the composite of any one of embodiments 43-57.

63. Insulation material comprising the composite of any one of embodiments 43-57.

64. A coated aerogel comprising aerogel having pores, wherein said aerogel is at least partially coated with at least one coating to substantially prevent intrusion of a ceramic and/or glass into said pores.

65. The coated aerogel of embodiment 64, wherein said coating has a surface and an inner pore volume and wherein said coating is on the surface of said aerogel, thus closing the pores but not penetrating into the inner pore volume of the aerogel.

66. The coated aerogel of any one of embodiments 64-65, wherein said coating has an inner pore volume and said coating prevents said ceramic and/or glass from entering into the inner pore volume of the aerogel.

67. The coated aerogel of any one of embodiments 64-66, wherein said coating on said aerogel is a polymeric coating.

68. The coated aerogel of any one of embodiments 64-67, wherein said coating comprises at least one lipophilic polymer.

69. The coated aerogel of any one of embodiments 64-68, wherein said coating comprises a wetting agent or surfactant.

70. The coated aerogel of any one of embodiments 64-69, wherein said coating is a wax or inorganic material such as glass or a ceramic.

71. The coated aerogel of any one of embodiments 64-70, wherein said coating consists of a surface coating on said aerogel.

72. The coated aerogel of any one of embodiments 64-71, wherein said coating bridges over said pores.

73. The coated aerogel of any one of embodiments 64-72, wherein said coating is an organic polymer.

74. The coated aerogel of any one of embodiments 64-73, wherein said coating is a water-based polymer and said coating comprises a surfactant or wetting agent.

75. The coated aerogel of any one of embodiments 64-74, wherein said coating penetrates no more than 10% beneath the surface of said aerogel, wherein said percentage is based on the average diameter of the aerogel.

76. The coated aerogel of any one of embodiments 64-75, comprising a treating agent present between said coating and aerogel.

77. The coated aerogel of any one of embodiments 64-76, comprising at least two coatings.

78. The coated aerogel of embodiment 77, wherein a first coating substantially prevents intrusion of said ceramic and/or glass into said pores, and wherein at least a second coating provides one or more functional properties to the coated aerogel.

It should be noted that in any one of the composites, methods, articles or coated aerogels referred to in embodiments 1-78, the aerogel may be an ormosil aerogel.

It is to be understood that both the foregoing general description and the following detailed description are exemplary and explanatory only and are intended to provide a further explanation of the present invention, as claimed.

DETAILED DESCRIPTION OF THE PRESENT INVENTION

Figure 1:
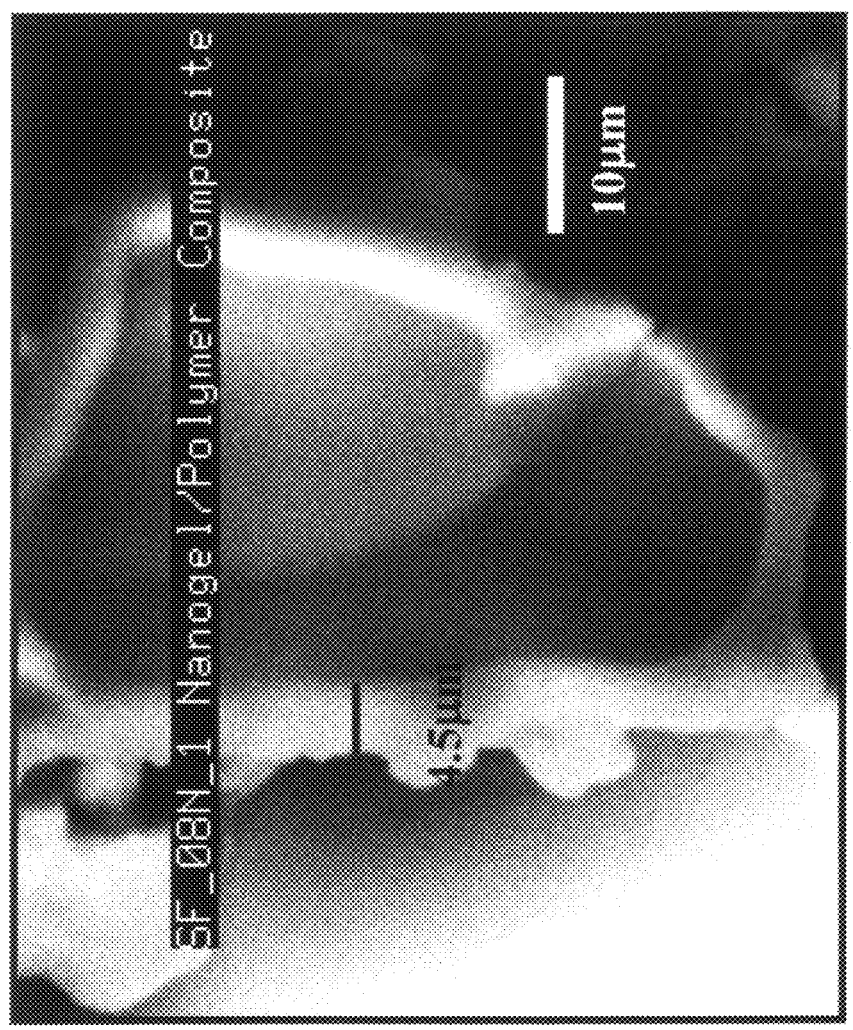
FIG. 1 is a microphotograph of an embodiment of the present invention which is an aerogel particle with a polymer coating.

The present invention relates to treated aerogel and/or coated aerogel. The treated aerogel and/or coated aerogel can be used in a number of applications including use in the formation of composites with at least one polymer. The present invention also relates to composites containing aerogels. The present invention further relates to methods of making these composites, as well as uses for these composites. In more detail, the present invention relates to a composite containing at least one polymer and at least one aerogel. Generally, the polymer in the composite is present as the matrix or continuous phase or binder. Instead of, or in combination with the polymer, the matrix (or continuous phase or binder) can also comprise at least one of an inorganic material, for example, glass and/or ceramic(s). The aerogel is dispersed or otherwise present in this continuous phase. The aerogel can be present uniformly or non-uniformly, or randomly. In the present invention, the aerogel can be coated with at least one coating or layer to substantially prevent intrusion of the matrix material (e.g. at least one polymer, and/or inorganic material including, but not limited to ceramic, glass or combinations thereof) into the pores of the aerogel. In addition or alternatively, the aerogel can be treated with a treating agent to form a treated aerogel. The treating agent can be, for instance, at least one surfactant and/or wetting agent. Also, the aerogel can be first treated to form a treated aerogel and then coated to form a coated, treated aerogel. In the alternative, the aerogel can first be coated to form a coated aerogel and then subsequently treated to form a treated, coated aerogel. Specific examples of treating agents and coating agents are discussed in more detail below.

With respect to the polymer, the composite can contain one or more polymers, such as two, three, four, or more different types of polymers. Generally, a polymer consists of repeating units of one or more types of monomeric units. The polymer can be a low molecular weight polymer or a high molecular weight polymer. The polymer can be a cross-linked polymer. The polymer can be a thermoplastic polymer or a thermoset polymer. The polymer can be an inorganic polymer or an organic polymer. There are no limitations with respect the type of polymer than can form the polymeric matrix or continuous phase of the composite. More than one polymer can form the continuous phase. The polymer can be a blend of polymers that form the continuous phase. If more than one polymer is present, one polymer can form the continuous phase and one or more other polymers can be present as a non-continuous phase or more than one polymer forms the continuous phase. In some embodiments, any type of polymer matrix can be used in the present invention. Generally, the polymer(s) forming the matrix or continuous phase can comprise the majority of the percent by weight and/or volume of the composite. For instance, in one or more embodiments, the polymer(s) can form from about 20% to about 99% by weight of the composite, more preferably from about 50% to about 99%, or from about 80% to about 99%, by weight of the composite.

The polymer can be a water-based polymer or an organic-based polymer or an inorganic polymer. The polymer used in the method of making the syntactic foam of the present invention may be any resin that is effectively employed in syntactic foam manufacture. The classes of resins used for syntactic foam manufacture may include but are not restricted to amino resins, epoxide resins, phenolic and other tar acid resins, urea and melamine resins, vinyl resins, styrene resins, alkyd resins, acrylic resins, polyisocyanate, polyethylene resins, polypropylene resins, petroleum polymer resins, polyamide resins, polycarbonate resins, acetal resins, fluorohydrocarbon resins, polyester resins and polyurethane resins. Further, the polymer may be water soluble copolymers such as poly(N-vinylpyrrolidone-vinyl acetate). A particularly preferred resin is a phenolic resin. Pharmaceutically acceptable homopolymer resins can be suitable for use in the present invention, and include homopolymers of acrylic acid crosslinked with allyl sucrose or allyl pentaeydiritol, homopolymers of acrylic acid crosslinked with divinyl glycol, homopolymers of acrylic acid with long chain alkyl acrylate comonomers crosslinked with allyl pentaerydiritol having molecular weight of 500,000 to 10 billion. Crosslinked polyacrylic acids available from the B.F. Goodrich Co. under the trade name Carbopol® and Noveon® resins can be used, such as Noveon® AA-1 USP, Carbopol® 971P NF, Carbopol® 934P NF, and Carbopol® 974P NF.

In addition, as an option, one or more crosslinking agents can be present in the composite formulation. Depending on the nature of the polymer, the polymer may include a crosslinking agent or hardener which causes solidification of the polymer material. In cases where the polymer includes a cross-linker to solidify, it is preferred that the weight ratio of hardener to polymer is 1:10. The ratio of hardener to polymer can vary depending on the type of polymer and the degree of crosslinking that is desired. For example, increased amounts of hardener will allow low temperature curing and will speed up gelation. Decreasing the relative amounts of hardener to polymer to a weight ratio as low as 5:100 may be possible, but higher curing temperatures and longer gelation times may be required.

Any aerogel can be used in the present invention. The aerogel can be in any form, such as film, thin films, monoliths, broken or cracked monoliths, particles, blankets, mats, battings, and/or other fiber-reinforced forms thereof. For instance, the aerogel can be in particulate form. The aerogel can be particles, agglomerates, granules, clusters, and larger shapes depending upon the particular end-use application. The aerogel can be a hydrophobic aerogel or can be a hydrophilic aerogel or can be mixture. In at least one of the embodiments, the preferred aerogels for use in the present invention are those that are based on metal oxides that are suitable for a sol-gel technique (C. J. Brinker, G. W. Scherer, Sol-Gel Science. 1990, Chaps. 2 and 3), such as Si or Al compounds, or those based on organic substances that are suitable for the sol-gel technique, such as melamine-formaldehyde condensates (U.S. Pat. No. 5,086,085) or resorcinol-formaldehyde condensates (U.S. Pat. No. 4,873,218). They can also be based on mixtures of the above-mentioned materials. An aeorgel can also be an ormosil aerogel of a type described in US Patent Publication Nos. 2005/0192366 or 2005/0192367, incorporated by reference herein in their entireties. Preferably, aerogels containing silicon (Si) and/or other elements like Ti, W, Zr, and the like or compounds thereof and, more preferably, $SiO_2$ can be used. To reduce the radiative contribution to thermal conductivity, the aerogel can contain IR opacifiers, such as carbon black, titanium dioxide, iron oxide, or zirconium dioxide, or mixtures thereof. The aerogels can have any particle size that allows them to be dispersed within the slurry. The aerogels can have various particle size distributions. The aerogels can be in the form of comminuted powders In one or more embodiments, any commercially available hydrophobic or hydrophilic aerogel can be used in the present invention. Examples include, but are not limited to, aerogels commercially available from Cabot Corporation. Particular commercially available types include, but are not limited to, Nanogel® aerogels. An advantage of the present invention, and in particular the preferred process used with the present invention, is that the aerogel is pre-formed and therefore any desirable structure, morphology, or other characteristic can be chosen, and this characteristic is essentially present in the final product.

The aerogel particles used in the present invention can have hydrophobic surface groups. In order to avoid any subsequent collapse of the aerogels by the condensation of moisture within the pores, it is preferred that hydrophobic groups be covalently bonded on at least the inside surface of the aerogel. Preferred groups for permanent hydrophobization are mono-, di-, or tri-substituted silyl groups of the formulas:

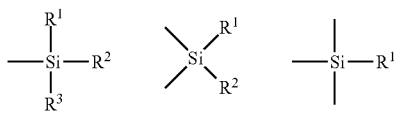

where $R^1$ is hydrogen or a non-reactive linear, branched, cyclic, aromatic, or heteroaromatic organic radical, preferably, a linear, branched, or cyclic $C_1$-$C_{18}$-alkyl radical or a $C_6$-$C_{14}$-aryl radical. $R^2$ and $R^3$, which can be the same or different, can be hydrogen or a non-reactive linear, branched, cyclic, aromatic, or heteroaromatic organic radical, preferably, a linear, branched, or cyclic $C_1$-$C_{18}$-alkyl radical, a $C_6$-$C_{14}$-aryl radical, an OH or OR' group, wherein R' is a linear or branched $C_1$-$C_6$-alkyl radical; preferably trialkyl and/or triarylsilyl groups. More preferably, $R^1$, $R^2$, and $R^3$, which can be the same or different, are $C_1$-$C_6$-alkyl, cyclohexyl, or phenyl.

The use of trimethyl- and dimethylsilyl groups for permanent hydrophobization of the aerogel can be particularly advantageous. These groups can be introduced as described in WO 94/25149 (incorporated in its entirety by reference herein) or by gas-phase reaction between the aerogel and, for example, an activated trialkylsilane derivative, such as a chlorotrialkylsilane or a hexaalkyldisilazane (cf. R. Iler, The Chemistry of Silica, Wiley & Sons, 1979).

Furthermore and within certain limits, the thermal conductivity of the aerogels can decrease as porosity increases and density decreases. For this reason, aerogels with porosities of greater than about 60% and densities of less than about 0.8 g/cc are preferred. More preferably, the aerogels of the present invention have densities of from about 0.01 to about 0.15 g/cc. The thermal conductivity of the aerogel particles can be less than 100 mW/m° K or less than about 40 mW/m° K, preferably, less than about 25 mW/m° K, and, more preferably, the thermal conductivity of the aerogel particles is from about 12 to about 18 mW/m° K, or lower. For purposes of the present invention, thermal conductivities are based on measurements at a mean temperature of 12.5° C. or at ambient temperatures, such as from 12.5° C. to 30° C.

The aerogels can have any particle size that allows them to be dispersed within the polymer matrix, such as from about 2 nm to 5 mm or from 40 nm to 1 mm, or from 10 micron to 1 mm. The aerogels can have various particle size distributions. The aerogels can be in the form of comminuted powders.

The aerogel can be present in any desirable amount to achieve the particular density and/or thermal conductivity of the overall composite. For instance, the aerogel can be present in an amount from about 1% to about 99%, and more preferably from about 20% to about 75% or from about 20% to about 60% based on the volume of the overall composite, wherein volume is based on gas present in the aerogel, without intrusion of polymer in the pores.

As stated earlier, the aerogel used in the composite of the present invention is coated or encapsulated to prevent intrusion (or substantial intrusion) of the polymer into the pores of the aerogel. The coating or coated aerogel or encapsulated aerogel for purposes of the present invention refers to a coating on the aerogel surface that prevents intrusion (or substantial intrusion) of the polymer (or of the other above described matrix materials such as ceramics and/or glass) from the matrix into the pores of the aerogel. This coating can be a shell, layer, or other similar type structure that is placed on the surface of the aerogel to prevent the intrusion or egress of the polymer (or of the other above described matrix materials such as ceramics and/or glass) from the matrix or continuous phase of a composite. The coating can be attached onto the surface of the aerogel by any means, such as chemical attachment adsorption, and the like. The layer forming the coating can be present as a physical layer with no adsorption or chemical attachment to the aerogel and simply remains intact due to its encapsulation around the aerogel. In more detail, the coating(s) can be an organic or inorganic coating. For instance, the coating can be a polymeric material and contained or be formed from one or more polymers. The coating can be a reactant or be polymerizable or initiate a polymerization. The coating can be a surfactant or wetting agent based coating. Other examples of coatings include, but are not limited to, polyvinyl acetate, epoxy, or nylon. Alternatively, the coating can be a wax or an inorganic material such as a ceramic or a glass. In at least one embodiment, the coating is applied as a wet coating in order to achieve uniform coating of the aerogels and then the wet coating or layer is dried in order to form a hard or cured coating that is not easily removable. In one or more embodiments, the coating layer on the aerogels is preferably a thin coating which serves to block the majority or all of the pores of the aerogel so as to prevent the subsequent intrusion of the material that forms the composite from entering into the pores of the aerogel. Generally, it is undesirable for the material of the composite to enter entirely the pores, such as the inner pore volume of the pores, of the aerogels since this would defeat the advantages achieved with the use of aerogels from the standpoint, for instance, of density reduction and/or reduction in thermal conductivity. It is preferred that the coating on the aerogel does not penetrate deeply into the pores of the aerogel for the same reason. Thus, the coatings used in the present invention can preferably bridge across the pores or block the pores or cover the pores of the aerogel, but preferably do not substantially penetrate into the pores of the aerogel. In one or more embodiments, preferably, the coating does not penetrate more than 10% of the overall diameter of the aerogel. As an example, if the diameter of the aerogel is 10 mm, preferably the coating does not penetrate more than 1 mm into the subsurface of the aerogel. The coating on the aerogel can be uniform, substantially uniform, or non-uniform. Again, preferably, whether uniform or non-uniform, the coating preferably blocks or bridges a majority or all of the pores of the aerogel exposed on the surface of the aerogel to prevent the material of the composite from entering these pores of the aerogel. Preferably, the coating on the aerogel has a layer thickness of from about 100 nm to about 3 mm, such as from about 0.5 micron to about 1 mm, or from about 0.5 micron to about 10 microns. The coating or layer on the aerogel can serve as an encapsulation of the aerogel. This encapsulation can be a full encapsulation or a partial encapsulation (e.g., 50%, 60%, 75% or more of the surface area). The following paragraphs describe various coatings and the formation of the coatings on the aerogel realizing that these examples are merely exemplary of the present invention.

Examples of coating substances include, but are not limited to, lipophilic polymers, such as polyvinyl alcohol, polyethylene waxes, steric acids, and the like. A coating that can be applied to the aerogel is a polymer coating, such as polyvinyl alcohol (PVA). The PVA coating can be applied as a wet coating and then preferably slowly dried, for instance in a stream of hot air at for instance 100° C. For instance the PVA coating solution can be a 10% w/w aqueous solution of PVA. Other concentrations can be used. As stated above, the aerogel particles of the present invention can be hydrophobic and/or have hydrophobic surface groups. However, hydrophobic aerogel particles cannot be wetted by water. In general, when hydrophobic aerogel particles are added to water they simply float on the surface, even under vigorous agitation. In one or more embodiments, in order to achieve a homogeneous distribution of the hydrophobic aerogel particles in the polymer composite, the aerogel can be coated or treated to be introduced into a water-based polymer, such as a latex or acrylic resin. The coating can be formed from at least one wetting agent, such as at least one surface active agent (e.g., surfactant), and/or at least one dispersant. The wetting agent is applied to the surface of the aerogel in any fashion and the coating can optionally be dried. The coating on the aerogel can be a dried coating or a wet coating prior to be introduced into the polymer matrix to form the composite. The dispersant may be selected from ionic (anionic and cationic) surfactants, amphoteric surfactants, nonionic surfactants, high molecular surfactants, and high molecular compounds, for example. The anionic surfactants include alkyl sulfates and higher alkyl ether sulfates, more specifically, ammonium lauryl sulfate, and sodium polyoxyethylene lauryl ether sulfate, for example.

The cationic surfactants include aliphatic ammonium salts and amine salts, more specifically, alkyl trimethylammonium, and polyoxyethylene alkyl amine, for example. The amphoteric surfactants may be of betain type, such as alkyl dimethyl betain, or of oxido type, such as alkyl dimethyl amine oxido, for example.

The nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others. A homogeneous distribution of the hydrophobic aerogel particles in the polymer provide the composite material with substantially uniform thermal conductivity.

Typical wetting agents that can be used include, for example, AEROSOL OT (sodium di-2-ethylhexylsulfosucenite), BARLOX 12i (a branched alkyldimethylamine oxide), TRITON 100 (octylphenoxypolyethoxy(9-10)ethanol), TWEEN surfactants like TWEEN 100 surfactant, and BASF pluronic surfactants. A general class is glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids.), alcohol ethoxylates, alcohol alkoxylates, ethylene oxide/propylene oxide block copolymers, polyoxyethylene derivatives of sorbitan esters or combinations thereof. Generally, any wetting agent that is compatible with the aerogel can be used. The wetting agent or the coating agent or the treating agent or the surfactant can also be a reactant (e.g., with $NH_2$ or COOH or CNO groups) or polymerizable (e.g., with C=C bonds) or be able to initiate a polymerization reaction.

The coating on the aerogel can be two or more coating layers or encapsulations. For example, when two or more coatings are present, the coatings can be the same or different from each other. As an example, a water-based coating can be applied onto the aerogel and then an organic-based or oil-based coating can then be subsequently applied to the previously-coated aerogel to form a double coating or multi-coated aerogel. Multi-coated aerogels are beneficial since each coating can serve a desired purpose. For instance, one coating may serve as a means to block or bridge over the pores to create a coated aerogel. A second coating can be applied over this coating to strengthen the coated aerogel, such as with respect to mechanical strength. A second coating or subsequent coating, if it was applied first, may not be able to bridge over the pores to create a coated aerogel since it may be of such a chemical nature that it would enter into the inner pore volume of the aerogel and therefore would not be useful as a first coating. However, if a first coating is applied that is capable of serving as a means to bridge over or block the pores of the aerogel, then a subsequent coating, as long as it is not detrimental to the first coating, can be applied on top to add value to the overall coated aerogel. One such example would be the formation of a first coating using a water-based epoxy and then applying an oil-based epoxy to the previously-coated aerogel, which will serve to add mechanical strength to the overall coated aerogel. The second coating may also be selected so as to facilitate or improve the interaction of the coated aerogel with the composite and/or matrix material.

As stated, in at least one embodiment of the present invention, the aerogel can be treated with at least one treating agent to form a treated aerogel. The treating agent, for instance, can be at least one wetting agent and/or at least one surfactant. The treated aerogel, unlike the coated aerogel, as described above, remains substantially porous after treatment. Thus, the treated aerogel prevents intrusion or egress of a polymer from a polymer matrix into the pores of the aerogel by its hydroplastic nature and not by blocking the pores. The treating agent assists in distributing or dispersing the aerogel into a polymer, such as a water-based polymer. Examples of suitable treating agents include, but are not limited to, the wetting agents and surfactants described above. The treating agent used to form the treated aerogel can be present on the surface of the aerogel by means of chemical attachment with the aerogel, absorption, hydrogen bonding, and the like. A surfactant and/or wetting agent can serve as a coating if applied in a sufficient amount and cured, preferably slowly, to maintain the bridging over the pores. In the alternative, a surfactant and/or wetting agent can be applied onto the surface of the aerogel and form a treated aerogel based on the amount of treating agent being less and/or the curing of the treating agent being rapid, thus not effecting a bridging over the pores, and thus permitting the aerogel to remain porous. In some embodiments, the coating agent and/or treating agent can be reactive with the aerogel surface or non-reactive with the aerogel surface. In the present invention, the treating agent and/or coating agent can be polymerizable and/or be reactive with another component of the composite.

As stated, in at least one embodiment of the present invention, the aerogel can be treated first to form a treated aerogel and then coated to form a coated, treated aerogel. For example, anionic surfactant treated aerogel particles can be subsequently coated with a positively charged polymer (polyethyleneimine, PEI). One or more embodiments of the present invention, relate to the treated aerogel by itself as well as a coated aerogel by itself.

Treating agents such as surfactants (which may or may not be reactive) to form an aqueous shell around the aerogel particle can be used. For instance, where the aqueous shell has the reactant "hexane diamine" dissolved. Bringing such particles in contact with an organic solution of sebacoyl chloride in hexane results in the instantaneous formation of nylon 6,10 at the water-hexane interface. The reaction is reactant limited, i.e. the hexane diamine concentration. This nylon film forms an impervious coating to epoxy ingress.

Also, treating agents such as a surfactant to wet an aerogel can be used and can act as an initiator for a chain polymerization reaction of a monomer present in the aqueous phase. The chemical structure of the monomer can make its oligomeric and/or polymeric form be surface active, thereby forming a coating on the hydrophobic aerogel particle.

In general, aerogel particles, such as hydrophobic aerogel, can include, but are not limited to, a large surface area, such as, for example, from about 300 $m^2/g$ to 1,000 $m^2/g$, like about 700 $m^2/g$. Accordingly, the amount of surfactant or dispersant that would allow complete wetting of the aerogel may be large. Generally, complete wetting is considered to take place when a sufficient amount of wetting agent has been added to allow the water to penetrate the interior of the aerogel particles so that they sink in the aqueous medium. Typically, the addition of more than about 0.6 to 0.8 parts by wt. wetting agent to about 1 part by wt. aerogel can result in full wetting of the hydrophobic aerogel particles. However, when the aqueous slurry is substantially dried, the fully wetted particles can exhibit a large increase in particle bulk density. As a consequence, the thermal conductivity of the composite material made with fully wetted aerogel particles tends to have higher thermal conductivities.

In one or more embodiments, in order to satisfactorily retain the hydrophobicity and low density of the hydrophobic aerogel particles, it is preferable to use an amount of wetting agent to only wet the outer surface layers of the hydrophobic aerogel particles. Thus, a sufficient amount of wetting agent can be present to be adsorbed on the outer surface of the aerogels particles. When the outer surface layers of the aerogel particles are only wetted, there may be a negligible increase in the bulk density of the aerogel particles on drying. As a consequence, the hydrophobicity of the hydrophobic aerogel particles is relatively unaffected and the composite material tends to have a low thermal conductivity. Thus, in one or more embodiments, preferably about 0.6 parts by wt. or less wetting agent to about 1 part aerogel by wt. is used. For instance, 0.01 part to about 0.5 parts by wt. wetting agent can be used to about 1 part by wt. aerogel. The wetting agent can be pre-applied to the aerogel. The wetting agent can be covalently attached to the aerogel.

The amount of wetting agent to only cause the wetting of the outer surface layers of the aerogel particles can depend on the size of the hydrophobic aerogel particles. In general, particles of smaller size require more wetting agents. Preferably, in one or more embodiments, the wetting agent is in an amount sufficient to allow substantial recovery of the hydrophobicity and low density of the hydrophobic aerogels after drying. More preferably, the wetting agent is in an amount sufficient for the final composite material to have a thermal conductivity of less than about 200 mW/m° K, and, most preferably, to have a thermal conductivity of from about 20 to about 150 mW/m° K, such as from about 40 to about 100 mW/m° K.

As another example, when the polymer matrix or continuous phase is an organic-based polymer or oil-based polymer, the aerogel can have a coating that is a water-based polymer coating. The coating can be dissolved, emulsified, or dispersed in a solvent (e.g., aqueous or non-aqueous) and used to wet the aerogel and form a coating. In one or more embodiments, this different coating from the polymer matrix prevents the penetration of the organic-based polymer into the pores of the aerogel. Examples of water-based polymer coatings are in part described above. Preferred water-based coatings include, but are not limited to, polyvinyl acetate, epoxy, acrylates, and polyurethanes. As an alternative, the aerogel can be coated by dissolving or dispersing one or more chemical(s) or reactants in water and then wetting the aerogel with this solution, emulsion, or dispersion, and then placing the aerogel in a non-polar solvent which contains a second reactant which reacts with the first reactant to form a chemical coating on the surface of the aerogel.

Another way to coat the aerogel is by coating the aerogel with a very fine powder which is significantly finer than the particle size of the aerogel. This fine powder will then, in essence, coat the surface of the aerogel. Then, the powder-coated aerogel can then be heated (or dissolved) or otherwise treated to melt (or otherwise distribute) the powder coating on the aerogel to form a uniform or substantially uniform coating which blocks the pores of the aerogel. The fine powder can alternatively assist or contribute to sintering of the aerogel to close the pores (e.g., such as the upper pore area). The surface of the aerogel can alternatively be treated by plasma or by other energy applications in such a manner to close the pores of the aerogel. Thus, in one or more embodiments, the aerogel is closing its pores with its own framework. The fine powder can be a polymer, wax, inorganic material, such as glass, and the like. Particular examples include paraffin wax, organic polymers like epoxies and thermoplastics. Generally, the fine powder which is coated onto the aerogel has a particle size of from about 100 nm to about 0.5 mm or 10 nm to 0.3 mm or 1 micron to 0.3 mm. The aerogel can be lightly wetted in order to improve the adherence of the fine powder on the surface of the aerogel. The fine powder which is coated onto the acrogel can have a lower melting point than the aerogel.

Another manner in which the coating can be applied to the aerogel particles is with the use of specific types of mills, such as classifier mills.

The various components, namely the aerogel particles and the coating substance can be fed into a classifier mill. The parameters can be chosen, such as to avoid only aerogel particles less than 20 microns leaving the mill. The coating substance can be fed with the aerogel particles as soon as contact between the aerogel and the coating substance is established.

With respect to forming the composite of the present invention, conventional means can be used. For instance, any means that are known to those skilled in the art of forming a composite from at least one polymer (ceramic and/or glass) and one filler can be used for purposes of the present invention. As a more specific example, the one or more polymers forming the composite when in an uncured or unhardened state (e.g., when the polymer is a liquid) can be introduced with the coated aerogel and mixed or stirred in order to disperse (e.g., uniformly) the coated aerogel amongst the continuous phase of the polymer. Afterwards, the mixture can be cured or hardened by conventional means such as, but not limited to, heating, UV curing, and the like. The composite can be poured into a mold, extruded, and the like. Essentially, any means that are used for the processing of or shaping of polymers can be used in the present invention. The composite can contain other conventional components or ingredients typically found in composites or syntactic foam compositions. For instance, the composite can contain conventional fillers, such as carbon black, silica, and the like. The composite of the present invention (or one or more individual components that comprise the composite) can include other ingredients, such as colorants, curing agents, UV protectants, plasticizers, toughening agents, fillers, reinforcing agents, polymer modifiers, stabilizers, and/or opacifiers. These various conventional ingredients can be used in conventional amounts which are known to those skilled in the art. In forming the composite, the coated aerogel can be introduced when the polymer is in a liquid state or in a state that permits the mixing of the coated aerogel with the polymer. The introduction of the coated aerogel can occur with a polymer that is pre-formed and is simply melted or in a liquid state or the coated aerogel can be introduced into a polymerization reaction which forms the one or more polymers that make up the continuous phase or matrix. In other words, the coated aerogel can be introduced during the in-situ preparation of the polymer. The pre-cured or post-cured composite can be formed into any shape or size or it can be reduced to any particle size or powder depending upon the end use.

The components that form the composite may be extruded, precast, sprayed, or formed from epoxy, polyester, urethane, or other polymeric material, whether rigid or flexible, and filled with the coated aerogel. One of ordinary skill in the art will of course recognize that the exact specifics of the syntactic elements will be selected based upon the operational characteristics of the use, e.g., insulated pipeline, such as the depth and ambient water temperature.

The composite of the present invention (e.g., syntactic foam) may have any geometry that allows the composite to be used in various applications. In addition, the pre-cured or post-cured composite may be configured to any shape or convenient length (e.g., less than one inch to several feet or more). The composite can be deformable and/or compressible. Typical shapes are hollow tubing, sleeves, or blocks and the like.

The syntactic foam or composite compositions and/or the coated aerogel and/or the treated aerogel of the present invention may be used as carriers, for chemicals, biologicals, nutraceuticals, growth factors, amino acids, bioactive materials and pharmaceutically active and inactive materials and have pharmaceutical, sanitary, veterinary, agricultural and medical applications. Thus, the present invention further relates to pharmaceutical and chemical syntactic foam compositions.

In addition, a coated thin film aerogel can be used as a low dielectric constant insulator in a microelectronic circuit. Thus, the present invention also relates to microelectronic fabrication.

In addition, the coating can be a thin film, in which the thin film can be thinner than 100 nm, preferably lower than 50 nm, such as lower than 10 nm, e.g. 1 nm to 9 nm. As such, the thin film could be continuous or discontinuous and can optionally at least partially impregnate the particle. The impregnated thin film can conform to the internal structure of the aerogel. The film can be deposited using vapor phase deposition techniques (such as chemical vapor deposition, physical vapor deposition or atomic layer deposition) or liquid phase deposition techniques (such as electrochemical deposition, electroless deposition, adsorption, or precipitation) or solid phase techniques. The thin film can be a polymeric material of the types disclosed above, an inorganic material (such as a glass or a ceramic), a bio-active material (such as proteins) or a metal (such as Ag, Au, Pt, Ru, Ta, Rh, Ir, Fe, Ni, Co, Mn, Nb, Pd, Pu, U) or a semiconductor (such as Si, Ge, $TiO_2$, ZnO, GaAs, GaN, InP). The thin film can be composed of multiple thin films chosen from the above class of materials. As such the thin film coated aerogel particles can find applications in areas involving surface reactivity such as catalysis, sensors, and/or electronic/optoelectronic devices.

Further, the present invention can be used in the same applications that conventional syntactic foams are used. These include, but are not limited to, pipes insulated with syntactic foam, buoyancy applications, and the like. Further, the materials and uses described in U.S. Pat. Nos. 6,848,863; 6,827,110; 6,800,668; 6,805,253; 6,758,710; 6,706,776; 6,476,087; 6,284,809; and 5,888,642, all of which are incorporated in their entireties by reference herein.

In addition, the aerogel of the present invention can be used in an aerogel-containing blanket. The blanket can include aerogel, fibers, and other components. The details of the aerogel-containing blanket, as described in U.S. patent application Ser. No. 11/013,306, can be used in the present invention with the aerogel of the present invention. The application is incorporated in its entirety by reference herein.

The use of the aerogel, such as aerogel particles of the present invention, as a replacement for glass microspheres in syntactic foam applications, such as wet insulation for sub-sea pipelines, can provide a 25%-40% percent improvement in thermal conductivity. This is especially possible when the aerogel surface is impervious to the polymeric matrix. For instance, in the present invention, thermal conductivities ranging from 60 to about 110 mW/m-K can be achieved. In the present invention, the aerogel itself can have a thermal conductivity significantly lower than glass microspheres, such as below 60 mW/m-K, and more preferably below 50 mW/m-K, and even more preferably from about 5 mW/m-K to about 30 mW/m-K.

With the present invention, the thermal conductivity of the overall composite can be as follows:

$\lambda_{composite} = \Phi \lambda_{aerogel} + (1-\Phi) \lambda_{polymer}$
$\Phi = 0.01-0.99$ $\Phi$=volume fraction of aerogel
$\lambda_{aerogel} = 4-100$ mW/m-K
$\lambda_{polymer} = 20-1000$ mW/m-K, where the polymer can have gas pockets The syntactic foams of the present invention can be hydrolytically stable and have a high compression E-modulus. The high compression E-modulus can be greater than 300 psi. These hydrolytically stable syntactic foams can be exposed to water at temperatures of from 0 to 40° C. for up to 20 years without degradation.

In addition, as an optional component, one or more binders can be present in the composite, and can be added when the composite is an uncured composite mixture.

Examples of suitable binders useful in the present invention include high molecular weight polysaccharide, xanthan gum, d-alpha-tocopherol polyethylene glycol 1000 succinate, starch NF, povidone, copolyvidone NF, polyvinyl alcohols, glyceryl behenate, xanthan gum, polyethylene glycols, polyethylene oxides, cellulose binders, hydroxypropyl Methylcellulose USP and hydroxyethyl Cellulose NF and particularly preferred are hydroxypropyl Methylcellulose USP and hydroxyethyl Cellulose NF.

The composite of the present invention, for instance, syntactic form, can have a density of from about 0.05 to about 1.0 g/cm³. More preferably, the density is from about 0.3 to about 0.8 g/cm³.

The present invention will be further clarified by the following examples, which are intended to be exemplary of the present invention.

EXAMPLES

Example 1

Nanogel® aerogel particles/PVA slurries were prepared by adding 10-micron sized Nanogel® particles (150 g) to 1.5 liters of a solution containing 150 g PVA and 20.5 g Barlox 12i (100% basis). After shaking and stirring, a slurry with a creamy consistency was formed, Laboratory drying of the slurry at 100° C. gave a layered structure, a top chunky layer, rich in PVA, a middle, powdery layer representing the bulk of the material and a bottom layer rich in PVA. Chunks of the top layer floated in isopropanol. The thermogravimetric study indicated that the sample contained 42 wt % Nanogel® particles (i.e., the PVA:Nanogel weight ratio was about 1.4:1). Mixing of the chunks into epoxy at 40 and 50 v % loadings (assuming the chunks had a density of 0.27 g/cc) gave composites that appeared to be pore-free. The epoxy containing 40 v % of the chunks floated in isopropanol. That containing 50 v % chunks was found to have a thermal conductivity of 93 mW/m° K, a value that compares very favorably with those of conventional syntactic foams.

Example 2

Nanogel Water Based Epoxy Composite:

A water based epoxy emulsion/dispersion was used along with an aqueous curing agent. The epoxy emulsion/dispersion was stabilized using surfactants. The hydrophobicity of the Nanogel particle resisted the ingress of the solution. One pot mixture of water based epoxy (WBE), aqueous curing agent and Nanogel particles was gently stirred. The excess surfactant in the WBE aids in wetting the Nanogel particles and an intimate nanogel-epoxy composite was achieved. Nanogel grades TLD302, TLD101, 08N which were 3.0, 1.0, and 0.08 mm in size respectively were used. The composite was dried overnight followed by curing at 70° C. for 12 hrs and resulted in a light weight composite that exhibited favorable thermal performance.

Typical compositions used: (i) sample SF_08N: 16 g of EPI REZ 3515, 4 g of EPI KURE 8535, 3 g of Nanogel 08N (ii) sample SF_101: 16 g of EPI REZ 3515, 4 g of EPI KURE 8535, 6 g of Water, 4 g of Nanogel TLD 101. EPI REZ and EPI KURE chemicals were obtained from Resolution Performance Products. SEM images were taken and clearly showed that an intimate mixture of Nanogel particles and epoxy was formed without pore infiltration. A magnified image of a region of the composite where a coated particle was seen with an epoxy had a coating thickness of 4.5 µm, see FIG. 1. The measured thermal conductivity of different samples prepared was in the 60-80 mW/m-K range depending on the volume loading of Nanogel (see Table 1). Comparisons with theoretical Maxwell and Parallel mixing models were made. While the thermal conductivity of the neat epoxy used in the formulation is not known, the literature values range from 190-250 mW/m-K. The sample could withstand 1.5 MPa of compressive stress with a 10% strain before failing.

TABLE 1

Table 1: Thermal performance of Nanogel-epoxy composites at different Nanogel loadings.

| Sample ID | Vol % Nanogel | Epoxy (k)* | Nanogel (k) | Maxwell Model (k) | Measured (k) |
|---|---|---|---|---|---|
| SF_08N_1 | 68 | 250 | 14 | 71.5 | 73 |
| SF_101_4_1 | 74 | 250 | 14 | 60.0 | 63 |
| SF_101_2_1 | 58 | 250 | 14 | 92.0 | 83 |

| Sample ID | Vol % Nanogel | Epoxy (k)* | Nanogel (k) | Parallel Model (k) | Measured (k) |
|---|---|---|---|---|---|
| SF_08N_1 | 68 | 190 | 14 | 70.3 | 73 |
| SF_101_4_1 | 74 | 190 | 14 | 59.7 | 63 |
| SF_101_2_1 | 58 | 190 | 14 | 88.0 | 83 |

Example 3

Water Based Epoxy Coated Nanogel Particle:

Instead of mixing the curing agent in the aqueous mix as in Example 2 above, a surface active curing agent was used to decorate the surface of the Nanogel particles, resulting in a thin coating of epoxy forming on the Nanogel particle.

Example 4

Figure 2:
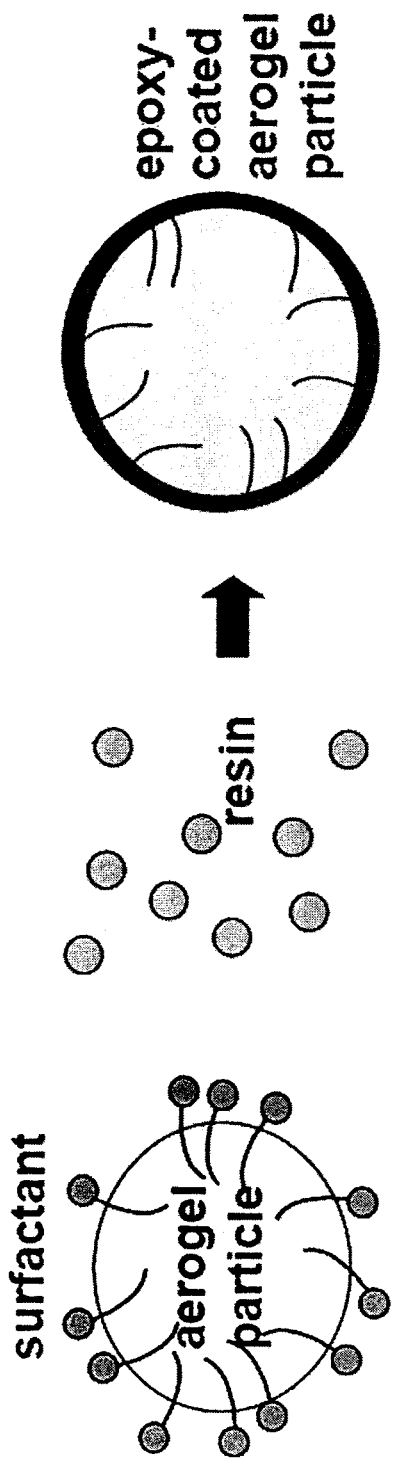
FIG. 2 is a schematic drawing which provides a simplified demonstration of a reactive-surfactant epoxy method of the present invention.

Epoxy Coating of Particles Using Reactive Surfactants:

A novel means of constructing a layer of resin directly on the surface of an aerogel bead is to coat the particle first in surfactants that have primary and secondary amines. These amines then serve as reactive sites, or curing agents, for epoxy. This approach demonstrating a reactive-surfactant epoxy method is shown schematically in FIG. 2.

Figure 3:
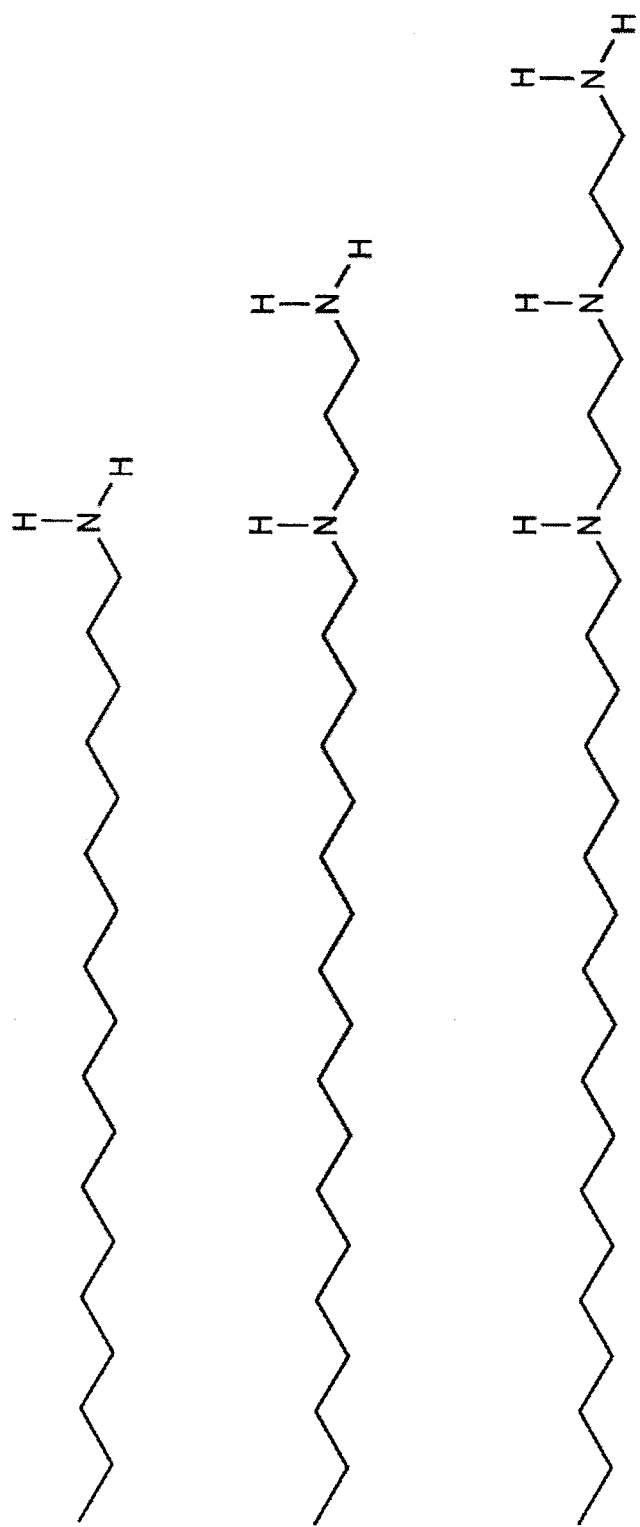
FIG. 3 are chemical structures of several surfactants with primary and secondary amine groups.

Surfactants with primary and secondary amine groups are commercially available, as shown in FIG. 3. The hydrogens on the amine group are available for bonding to the epoxy resin. The bottom two molecules allow for 3-D polymer structures.

Surfactants with three or more sites for potential resin bonding can lead to more cross-linking and a three-dimensional structure. This may act to cover the particle better than a two-dimensional structure. Additionally, three major classes of resin were tried: conventional (organic-phase) resins and high- as well as low-molecular-weight water-dispersed resins. A number of laboratory methods were used to explore effective coating techniques. For instance, sequential coating of the particles with layers of curing agent/surfactant and resin was tested. The amount of surfactant used was another experimental variable, determining how deep into the particle the water phase may ingress, and consequently how thick the epoxy coating may become and how much particle volume may be sacrificed in the process. The hydrogens on the amine group are available for bonding to the epoxy resin. The bottom two molecules shown in FIG. 2 can allow for 3-D) polymer structures.

Three surfactants used in this set of experiments are Duomeen C, Duomeen T, and Triameen T. All are brand names of surfactants available from Akzo Nobel, Inc. and are shown in Table 2. A fourth surfactant used here is octadecylamine, which contains only C18 chains.

TABLE 2

Properties of surfactants used in this experimental work

| Surfactant | Melting point ° C. | Density g/cc | HLB, Davies Scale 0-40 |
|---|---|---|---|
| Octadecylamine | 60-50 | 0.86 | <8.2 |
| Duomeen ® C (N-cocoalkyl-1,3-diaminopropane) $RNH(CH_2)_3NH_2$ | 15 (cloud point: 23) | 0.836 | 17.5 |
| Duomeen ® T (N-tallowalkyl 1-1,3-diaminopropane) $RNH(CH_2)_3NH_2$ | 40 | 0.84 | 15.6 |
| Triameen ® T (N-tallowalkyl dipropylene triamines) $RNH(CH_2)_3NH(CH_2)_3NH_2$ | 40 | 0.845 | 32 |

The general procedure for coating aerogel particles with an epoxy coating follows. The procedure listed is a typical procedure for producing coated 1 mm aerogel beads which will prevent epoxy ingress. Coating of aerogel particles with surfactant. Duomeen C was hydrated in water in a 1% w/w solution by vigorous shaking at 70° C. Aerogel particles were then introduced to this hydrated surfactant solution and the resulting mixture was again shaken until the particles were thoroughly wetted. A typical ratio of hydrated surfactant solution to 1 mm aerogel beads was 15.7 g/g. The particles were skimmed off the surface for the next step. Addition of coated beads to epoxy resin. Approximately 5 mL of Epi-Rez 3522-W-60, a water-dispersed epoxy resin, was placed in a suitable container, such as a 15-mL test tube with a cap, and preheated to 70° C. A small amount, typically 0.31 g, of wetted aerogel produced in the previous step was introduced to the top of the test tube that contained resin. The tube was inverted to wet the aerogel, then mixed in a vortex mixer alternatively right-side-up and upside-down for four seconds, twice. The tube was then encased in a secondary containment and kept in the 70° C. cabinet overnight.

Washing and analysis. The tube was removed from the 70° C. cabinet. The beads were scooped off the surface of the suspension and placed into a screw-top vial. Approximately 20 mL of water was added and the vial was shaken to wash resin off the beads. The entire solution was poured onto a filter and allowed to drain. The beads were then washed thoroughly with water. Performance of the beads was monitored by their ability to float in water and light paraffin oil.

Incorporation into oil-based epoxy. Wet coated aerogel particles produced in the previous step can be added to an oil-based epoxy resin. The resin used was 12.9 g of Dow Chemicals' DER 331 Resin with 1.0 g of Dow DEH 24 Curing Agent. This method has resulted in the creation of particles that successfully float on paraffin oil and water, and that can be incorporated into an oil-based epoxy resin and cured without ingress of the resin into the aerogel. For 1 mm beads, a surfactant:aerogel ratio of 0.1 g/g was the approximate minimum level that showed preferred results. This corresponds to a calculated radial penetration depth of approximately 0.034 mm into these 1 mm beads.

Example 5

Nylon Coating of Aerogel Particles.

Figure 4:
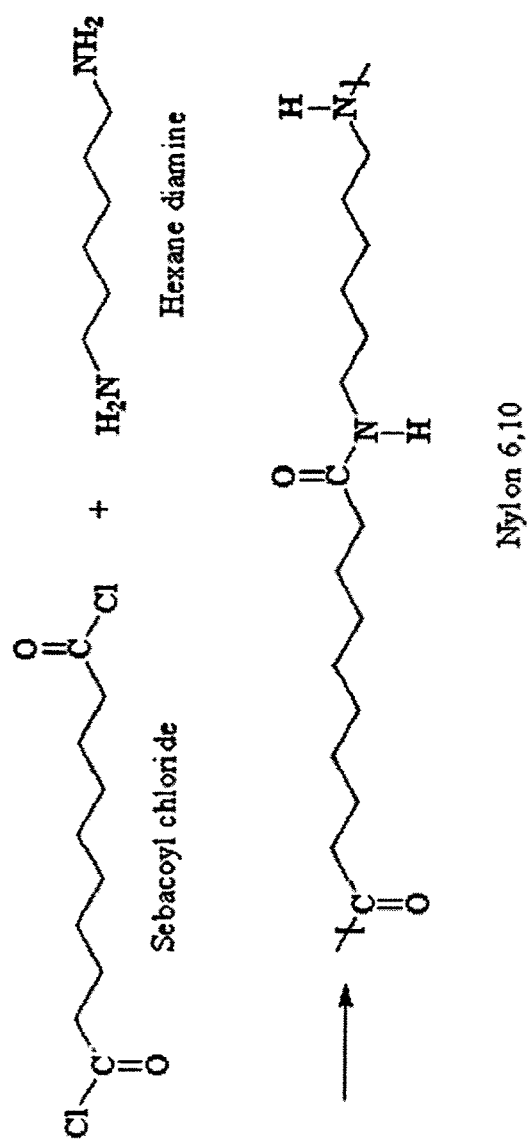
FIG. 4 is a reaction scheme for polymerization of nylon for the coating of aerogel particles.

Method of approach: In various embodiments, a polymer coating can fulfill two criteria: (1) the reaction needs to be fast enough to prevent any liquid phase from entering the particle by diffusion or capillary flow before polymerization proceeds to a point where a film is formed, or the polymer molecules are too large to flow or diffuse into the pores of the particles, and (2) the polymerization should result in a continuous film, able to cover the entire surface of the particle including the pores, preventing oil or water from entering the pores when the particles are embedded into the epoxy resin to form the syntactic foam. The polymerization of nylon fulfills these two criteria, being a very fast, interfacial reaction. The chemistry and stoichiometry of this reaction is shown in FIG. 4. The alkyl chloride monomer is soluble in the organic phase, e.g. cyclohexane, whereas the diamine monomers are soluble in a water phase. The polymerization occurs at the phase interface, forming a film of nylon, which may prevent the polymerization from proceeding further in either phase.

Figure 5:
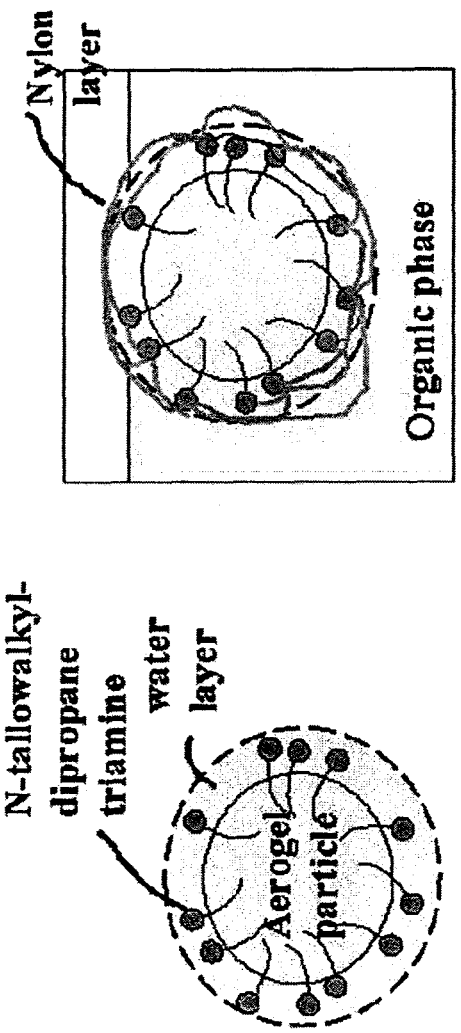
FIG. 5 is a schematic depiction of the coating of particles which involves surfactant-soaked particles with a water layer submerged in a solution of 5% v/v Sebacoyl chloride in hexane.

FIG. 5 illustrates a schematic of the nylon polymerization approach. Aerogel particles were coated with a reactive surfactant and 10% w/w hexane diamine in water, and then exposed to an organic phase. The interfacial reaction takes place at the particle surface.

As described above, the particles were first wetted by submerging them in water containing a surfactant with two or more amine groups at its polar end. However, since first results showed that the surfactant alone does not provide enough monomers for complete and rapid polymerization, additional hexane diamine was added to the solution. After scooping the particles off the water surface, they are coated with a water shell, as shown in FIG. 5. The water and surfactant soaked particles were then submerged in a solution of 5% v/v sebacoyl chloride in hexane. The polymerization occurs spontaneously and rapidly at the interface of the water shell and the organic solvent, ideally resulting in a nylon film coating around the aerogel particle.

A 5% w/w surfactant solution in water was prepared. The surfactant dissolved when the sample was placed in a 70° C. oven. Hexane diamine solution was prepared by diluting the stock solution from 60% w/w to 30% w/w in water. The particles were wetted using surfactant and diamine solutions: 0.6 g of 1 mm aerogel particles were mixed with 1.2 g surfactant solution for 1 mm particles or 1.6 g surfactant solution for 60-80 micron particles, corresponding to 10% or 14% w/w, respectively, of surfactant to particles. To this suspension, 3.3 g of 30% w/w diamine solution (resulting in a final concentration of 10% w/w), and 5.5 g water was added. Sebacoyl chloride (ClCO(CH2)8COCl) solution in hexane was prepared in a small glass vial. Using a glass pipette, 0.4 ml sebacoyl chloride were diluted in 5 ml hexane. Wetted particles were scooped off the surface of water phase. Wetted particles were dropped into the hexane phase. After the lid was screwed tightly, the contents were mixed by inversion. The solids were filtered through Whatman paper filter. The particles were washed with hexane. Particles were dried on the filter paper in the fume hood.

Coating individual particles: Individual particles of 1 mm size. The 1 mm particles were wetted and sebacoyl chloride solution was prepared as previously described. The particles were placed on a 1.18 mm mesh and pressurized air was used to spray a few particles through the mesh into an empty glass beaker. The sebacoyl chloride solution was poured into the beaker. If particles stuck to the glass, they were removed with a spatula. Particles were filtered and dried as before, and a few were submitted for SEM analysis. All solutions and wetted particles were prepared as before.

Figure 6:
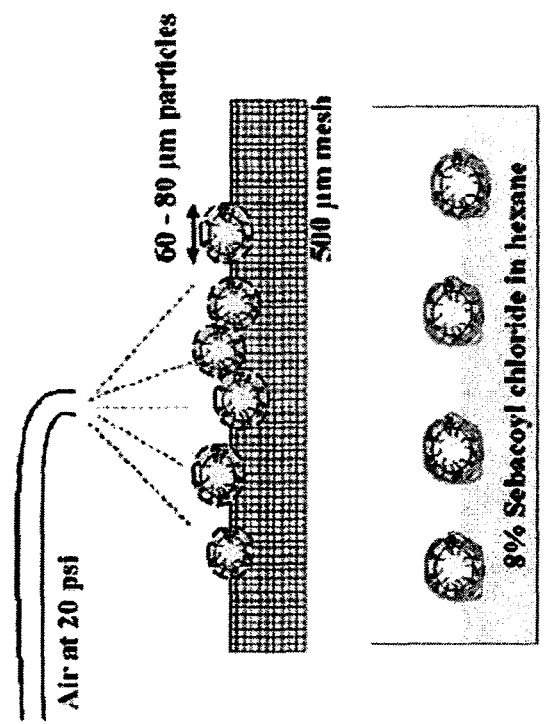
FIG. 6 is a schematic diagram showing the nylon coating of individual particles.

FIG. 6 illustrates a schematic representation of nylon coating of individual particles. Not drawn to scale. The 350 or 500 micron (not larger) mesh sieve was mounted on clamp/stand about 8 in above a large petri dish as shown in FIG. 6. The nitrogen or air pressure gauge was set to 20 psi. Water was poured into petri dish to a level of 1 cm. Maximum nitrogen flow was used to verify that splashing does not occur. Water was discarded. A part of the hood sash was placed as a shield in front of mesh and petri dish apparatus. Roughly 150 ml of sebacoyl chloride solution was needed per run, and was poured into the large petri dish. A clump of wetted particles was placed on the mesh centered above the petri dish. The sash was closed almost completely and the nitrogen stream was turned on and aimed at the particles. Particles were forced through the screen individually or in clumps of 2-3 particles. The particle formation in sebacoyl chloride was observed. The floating particles were skimmed off the surface and placed on a Whatman filter, washed with hexane and dried as described previously.

Epoxy composite with nylon coated aerogel particles: For the composite, 12.9 g of Dow D.E.R. 331 epoxy resin was mixed with 1.0 g DEH 24 curing agent, and 2.25 g of nylon coated 60 to 80 micron aerogel particles were added and mixed gently with a spatula. The mixture was poured into aluminum pans to produce pucks for conductivity testing and mechanical testing. Pucks were cured at room temperature overnight followed by 6 hours at 70° C. The nylon film appears continuous and even and about 5 microns thick.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A composite comprising at least one polymer as a continuous phase and aerogels in particulate form having pores, wherein the aerogels are dispersed amongst the continuous phase and said at least one polymer comprises a majority in weight percent of the composite, wherein said polymer does not substantially enter the pores of said aerogels and wherein said aerogels are coated on a surface thereof with a coating to substantially prevent intrusion of said polymer into said pores wherein the coating encapsulates from 75% to 100% of surface area of the surface of said aerogel, wherein said coating is a different coating from said continuous phase, and wherein said polymer is an organic polymer and said coating is a water-based polymer coating comprising a surfactant or wetting agent.

2. The composite of claim 1, wherein at least a portion of said aerogels are treated with at least one treating agent to form a treated aerogel in particulate form which remains substantially porous, wherein said treating agent is present between said coating and said aerogels.

3. The composite of claim 1, wherein said composite is a syntactic foam or an insulation material.

4. An insulated pipe comprising a pipe insulated with the syntactic foam of claim 3.

5. The composite of claim 1, wherein said at least one polymer is polyurethane, an epoxide resin, polypropylene, polyethylene, or any combination thereof.

6. The composite of claim 1, wherein the aerogels comprise sol-gel derived aerogel.

7. The composite of claim 1, wherein the aerogels comprise ormosil aerogel.

8. The composite of claim 1, wherein said coating bridges over or blocks said pores.

9. The composite of claim 1, wherein said water-based polymer coating comprises epoxy or nylon.

10. The composite of claim 1, wherein the coating blocks or bridges all of the pores of said aerogel.

11. The composite of claim 1, wherein the surfactant or wetting agent is alkyl sulfate, alkyl ether sulfate, alkyl trimethylammonium, polyoxyethylene alkyl amine, alkyl dimethyl betain, alkyl dimethyl amine oxido, glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, fatty acid alcohol ester, polyhydric alcohol fatty acid ester, sodium diethylhexylsulfosuccinite, branched alkyldimethylamine oxide, octylphenoxypolyethoxyethanol, alkoxylate, polyoxyalkylene fatty ether, sorbitan ester, monoglyceride, diglyceride, polyoxyethylene sorbitol ester, sodium coco-PG-dimonium chloride phosphate, coamidopropyl PG-dimonium chloride phosphate, phosphate ester, polyoxyethylene fatty acid ester, alcohol alkoxylate, ethylene oxide/propylene oxide block copolymer, polyoxyethylene derivatives of sorbitan ester, or any combination thereof.

12. A coated aerogel comprising aerogel in particulate form having pores, wherein said aerogel is coated with at least one coating capable to substantially prevent intrusion of a continuous phase polymer into said pores, wherein said aerogel has a surface and an inner pore volume and wherein said coating is on the surface of said aerogel wherein the at least one coating encapsulates from 75% to 100% of surface area of the surface of said aerogel, thus closing the pores but not penetrating into the inner pore volume of the aerogel, and said coating capable to prevent said polymer from entering into the inner pore volume of the aerogel, wherein said polymer is an organic polymer and said coating is a water-based polymer coating comprising a surfactant or wetting agent wherein said coating penetrates no more than 10% beneath the surface of said aerogel, wherein said percentage is based on the average diameter of the aerogel, and wherein the surfactant or wetting agent is alkyl sulfate, alkyl ether sulfate, alkyl trimethylammonium, polyoxyethylene alkyl amine, alkyl dimethyl betain, alkyl dimethyl amine oxido, glycerol fatty acid ester, propylene glycol fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, fatty acid alcohol ester, polyhydric alcohol fatty acid ester, sodium diethylhexylsulfosuccinite, branched alkyldimethylamine oxide, octylphenoxypolyethoxyethanol, alkoxylate, polyoxyalkylene fatty ether, monoglyceride, diglyceride, sodium coco-PG-dimonium chloride phosphate, coamidopropyl PG-dimonium chloride phosphate, phosphate ester, polyoxyethylene fatty acid ester, alcohol alkoxylate, or any combination thereof.

13. The coated aerogel of claim 12, comprising a treating agent present between said coating and aerogel.

14. The coated aerogel of claim 12, comprising at least two coatings, wherein a first coating comprises the water-based polymer coating, and wherein at least a second coating provides one or more functional properties to the coated aerogel, wherein the first and second coatings are different and the first coating is applied onto said aerogel and the second coating is applied over the first coating.

15. The coated aerogel of claim 12, wherein said coating is an impregnated thin film that conforms to the internal structure of the aerogel.

16. The coated aerogel of claim 12, wherein the aerogel comprises an ormosil aerogel.

17. The coated aerogel of claim 12, wherein said water-based polymer coating comprises epoxy or nylon.

18. A coated aerogel comprising aerogel in particulate form having pores, wherein said aerogel is coated with at least one coating capable to substantially prevent intrusion of a continuous phase polymer into said pores, wherein said aerogel has a surface and an inner pore volume and wherein said coating is on the surface of said aerogel wherein the at least one coating encapsulates from 75% to 100% of surface area of the surface of said aerogel, thus closing the pores but not penetrating into the inner pore volume of the aerogel, and said coating capable to prevent said polymer from entering into the inner pore volume of the aerogel, wherein said polymer is an organic polymer and said coating is a water-based polymer coating comprising a surfactant or wetting agent wherein said coating is a thin film with a thickness of 100 nm or less, and wherein the surfactant or wetting agent is alkyl sulfate, alkyl ether sulfate, alkyl trimethylammonium, polyoxyethylene alkyl amine, alkyl dimethyl betain, alkyl dimethyl amine oxido, glycerol fatty acid ester, propylene glycol fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, fatty acid alcohol ester, polyhydric alcohol fatty acid ester, sodium diethylhexylsulfosuccinite, branched alkyldimethylamine oxide, octylphenoxypolyethoxyethanol, alkoxylate, polyoxyalkylene fatty ether, monoglyceride, diglyceride, sodium coco-PG-dimonium chloride phosphate, coamidopropyl PG-dimonium chloride phosphate, phosphate ester, polyoxyethylene fatty acid ester, alcohol alkoxylate, or any combination thereof.

19. The coated aerogel of claim 18 comprising two or more additional thin films which can be the same or different material from each other.

20. A coated aerogel comprising aerogel in particulate form having pores, wherein said aerogel is coated with at least one coating capable to substantially prevent intrusion of a continuous phase polymer into said pores, wherein said aerogel has a surface and an inner pore volume and wherein said coating is on the surface of said aerogel wherein the at least one coating encapsulates from 75% to 100% of surface area of the surface of said aerogel, thus closing the pores but not penetrating into the inner pore volume of the aerogel, and said coating capable to prevent said polymer from entering into the inner pore volume of the aerogel, wherein said polymer is an organic polymer and said coating is a water-based polymer coating comprising a surfactant or wetting agent wherein the aerogel comprises a sol-gel derived aerogel, and wherein the surfactant or wetting agent is alkyl sulfate, alkyl ether sulfate, alkyl trimethylammonium, polyoxyethylene alkyl amine, alkyl dimethyl betain, alkyl dimethyl amine oxido, glycerol fatty acid ester, propylene glycol fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, fatty acid alcohol ester, polyhydric alcohol fatty acid ester, sodium diethylhexylsulfosuccinite, branched alkyldimethylamine oxide, octylphenoxypolyethoxyethanol, alkoxylate, polyoxyalkylene fatty ether, monoglyceride, diglyceride, sodium coco-PG-dimonium chloride phosphate, coamidopropyl PG-dimonium chloride phosphate, phosphate ester, polyoxyethylene fatty acid ester, alcohol alkoxylate, or any combination thereof.

21. A coated aerogel comprising aerogel in particulate form having pores, wherein said aerogel is coated with at least one coating capable to substantially prevent intrusion of a continuous phase polymer into said pores, wherein said aerogel has a surface and an inner pore volume and wherein said coating is on the surface of said aerogel wherein the at least one coating encapsulates from 75% to 100% of surface area of the surface of said aerogel, thus closing the pores but not penetrating into the inner pore volume of the aerogel, and said coating capable to prevent said polymer from entering into the inner pore volume of the aerogel, wherein said polymer is an organic polymer and said coating is a water-based polymer coating comprising a surfactant or wetting agent wherein said coating bridges over or blocks said pores, and wherein the surfactant or wetting agent is alkyl sulfate, alkyl ether sulfate, alkyl trimethylammonium, polyoxyethylene alkyl amine, alkyl dimethyl betain, alkyl dimethyl amine oxido, glycerol fatty acid ester, propylene glycol fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, fatty acid alcohol ester, polyhydric alcohol fatty acid ester, sodium diethylhexylsulfosuccinite, branched alkyldimethylamine oxide, octylphenoxypolyethoxyethanol, alkoxylate, polyoxyalkylene fatty ether, monoglyceride, diglyceride, sodium coco-PG-dimonium chloride phosphate, coamidopropyl PG-dimonium chloride phosphate, phosphate ester, polyoxyethylene fatty acid ester, alcohol alkoxylate, or any combination thereof.

* * * * *